US006275253B1

(12) United States Patent
Melen (10) Patent No.: US 6,275,253 B1
(45) Date of Patent: Aug. 14, 2001

(54) STEREOGRAPHIC IMAGE COMPRESSION WITH IMAGE MOMENT NORMALIZATION (75) Inventor: Roger D. Melen, Los Altos Hills, CA (US)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/113,937

(22) Filed: Jul. 9, 1998

(51) Int. Cl.[7] .............. H04N 13/00; G06K 9/00; G06K 9/36; G06K 9/32; G09G 5/00
(52) U.S. Cl. .............. 348/43; 382/154; 382/232; 382/298; 345/127
(58) Field of Search .............. 348/42, 43, 384, 348/390; 382/298, 232, 154; 345/127

(56) References Cited

U.S. PATENT DOCUMENTS

| 4,704,627 | * | 11/1987 | Yuyama et al. | 348/43 |
| 4,884,131 | | 11/1989 | Chevion | 358/88 |
| 4,905,081 | * | 2/1990 | Morton | 348/43 |
| 5,612,735 | * | 3/1997 | Haskell et al. | 348/43 |
| 5,619,256 | * | 4/1997 | Haskell et al. | 348/43 |
| 5,625,408 | * | 4/1997 | Matsugu et al. | 348/42 |
| 5,627,582 | * | 5/1997 | Muramoto et al. | 348/43 |
| 5,633,682 | * | 5/1997 | Tahara | 348/43 |
| 5,652,616 | | 7/1997 | Chen | 348/43 |
| 5,715,358 | * | 2/1998 | Ohnaka et al. | 386/108 |
| 5,748,199 | | 5/1998 | Palm | 345/473 |
| 5,774,589 | * | 6/1998 | Aritake et al. | 382/232 |
| 5,867,591 | * | 2/1999 | Onda | 382/154 |
| 5,886,736 | * | 3/1999 | Chen | 382/154 |
| 5,977,947 | * | 11/1999 | Potu | 345/127 |
| 6,057,884 | | 5/2000 | Chen | 348/416 |
| 6,072,831 | | 6/2000 | Chen | 375/240 |
| 6,084,978 | * | 7/2000 | Taylor et al. | 382/154 |
| 6,097,844 | * | 8/2000 | Melen | 382/232 |
| 6,111,596 | * | 8/2000 | Haskell et al. | 348/42 |

* cited by examiner

Primary Examiner—Jeffery Brier
Assistant Examiner—Ryan Yang
(74) Attorney, Agent, or Firm—Fenwick & West LLP (57) ABSTRACT A stereographic image compressor (100) includes an Image Size and Position Unit (ISPU) (101) that resizes and repositions a pair of images which are indicative, respectively, of first and second fields of view (111, 114) of an image (104) and which are generated by a pair of image sensor arrays (106, 108). The ISPU (101) causes both images to have a same size and position. The ISPU (101) generates a first modified image signal (103) and a second modified image signal (105) indicative of such resized and repositioned images. A function processing unit (118) generates a difference signal (120) indicative of differences between the first modified image signal (103) and the second modified image signal (105) The difference signal (120) is compressed by a lossy compressor (122) for storage on a storage device (102). The first modified image signal (103) is also compressed by a lossy compressor (124) for storage on the storage device (102). The image signals (110 and 112) are time synchronized by an image data synchronizer (116). The function processing unit (118) generates difference signal (120) by way of one of a plurality of mathematical operations.

19 Claims, 6 Drawing Sheets

STEREOGRAPHIC IMAGE COMPRESSION WITH IMAGE MOMENT NORMALIZATION

RELATED APPLICATIONS

This application is related to the following U.S. Patent Applications which are filed concurrently herewith and which are assigned to the assignee of the present application: STEREOGRAPHIC IMAGE COMPRESSION WITH IMAGE DIFFERENCE GENERATION AND LOSSY COMPRESSION; AND STEREOGRAPHIC IMAGE COMPRESSION WITH ADAPTIVE CONTROL PARAMETER GENERATION.

TECHNICAL FIELD

This invention relates generally to the field of image compression and more particularly to the field of compression of stereographic images.

BACKGROUND ART

Stereographic images are typically generated with two electronic image sensing arrays. These arrays are positioned at a distance from each other to create a pair of images having different fields of view of the same scene. The resulting pair of images can then be used to create a composite image containing depth information. Such depth information provides increased realism by providing a three-dimensional (3D) type view.

A significant drawback to such images is the increased data generated by the pair of images and the associated increased storage requirements for such data. The data generated by the dual arrays is twice the amount of data generated for an image having only a single field of view. High resolution images, which contain more data, amplify this problem. U.S. Patent Application entitled "STEREOGRAPHIC IMAGE COMPRESSION WITH IMAGE DIFFERENCE GENERATION AND LOSSY COMPRESSION," referenced above discloses novel techniques for compressing stereographic images.

A further problem with stereographic images is the difference in size and position between the images generated by the pair of sensing images. Typically, the difference in size and position result from differences between the sensing arrays and in the positioning of the sensing arrays relative to the scene being captured. Such differences result in increased distortion and reduced compressibility. Accordingly, there is a need for a system which reduces or eliminates differences in size and position of the pair of images contained in a stereographic image.

BRIEF SUMMARY OF THE INVENTION

The present invention advantageously provides resizing and repositioning of two fields of view that comprise a stereographic image. In a principal aspect, a stereographic image compressor (100) comprises an image size and position unit (101) which is responsive to a first image signal (110) and a second image signal (112). The first image signal (110) contains image information of a scene (104) from a first field of view (111) and the second image signal (112) contains image information of the scene from a second field of view (114). The image size and position unit (101) resizes and repositions images represented by the first and second image signals (110, 112) to generate a modified first image signal (103) and a modified second image signal (105). The modified first signal (103) and the modified second signal (105) each represent an image characterized by a same size and position The function processing unit (118) generates a difference image signal (120) that is indicative of differences between the modified first image signal (103) and the modified second image signal (105). A lossy compressor (126) compresses information contained in the difference image signal (120) to generate a compressed image information signal (126).

In certain preferred embodiments, the compressed image information signal (126) is stored along with the modified first or second image signals (103, 105), which is also preferably compressed. The scene (104) represented by the first (110) and second (112) image signals, together with depth information associated with the combination of the two signals (103, 105), can then be recreated for display from the stored first image signal (103 or 105), and the compressed image information signal (126). Resizing and/or repositioning the images representing the two fields of view 111 and 114 advantageously reduces data storage requirements and improves image quality.

These and other features and advantages of the present invention may be better understood by reference to the attached specification and drawings.

BRIEF DESCRIPTION OF THE DRAWINGS

FIGS. 4(a–d) are block diagrams showing alternative embodiments of the function processing unit of FIG. 1.

DETAILED DESCRIPTION OF THE PREFERRED EMBODIMENTS

Figure 1:
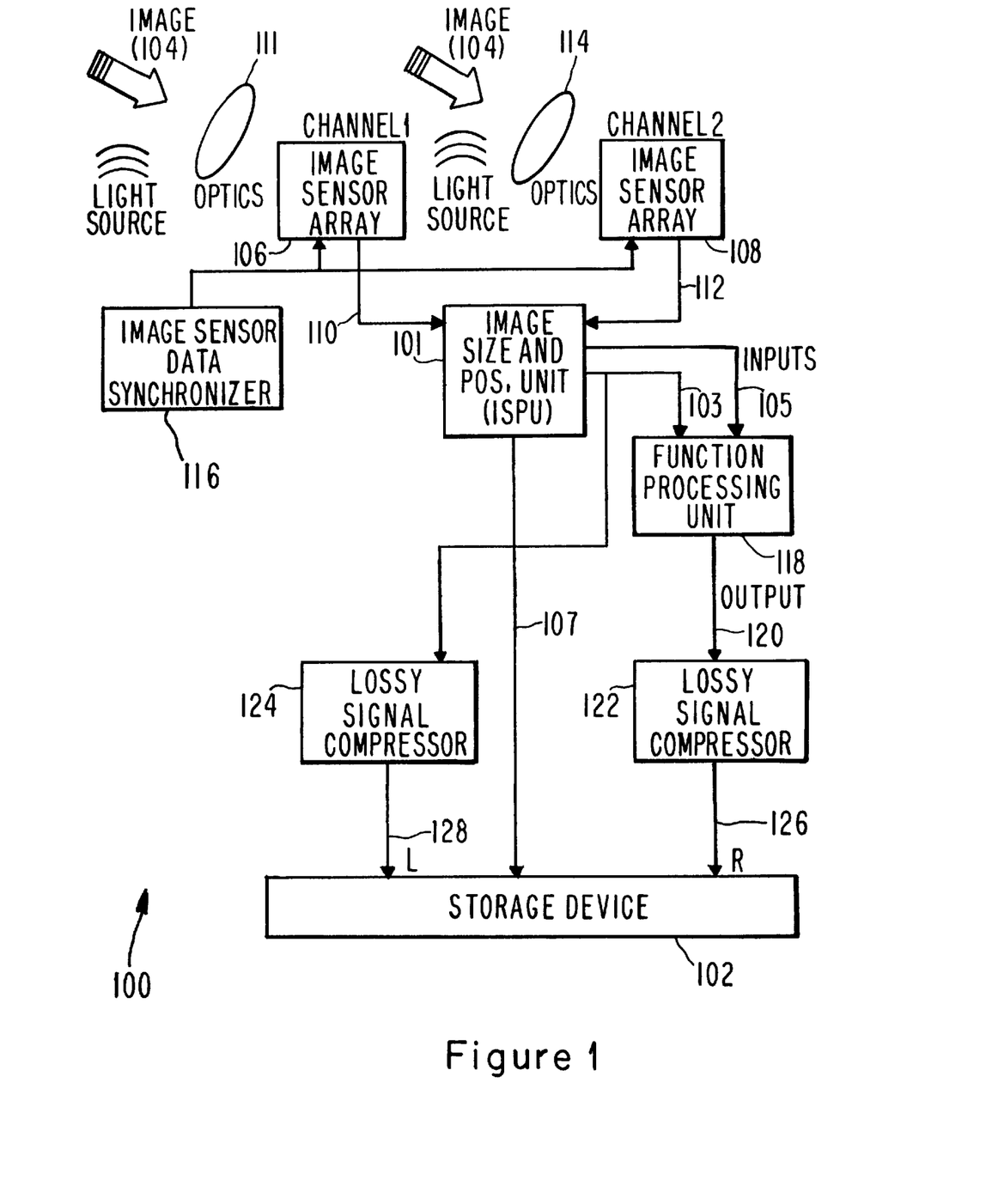
FIG. 1 is a block diagram of a stereographic image compression system employing the principles of the present invention.

In FIG. 1, a stereographic image compression system 100, operates to generate compressed image data, 126 and 128, indicative of stereographic images for storage in storage device 102. The image information stored in storage device 102 preferably comprises two channels of information. The two channels of information are generated by image sensor arrays 106 and 108. Image sensor array 106 generates an image signal 110 indicative of a first field of view 111 of image 104. Image sensor array 108 generates an image signal 112 indicative of a second field of view 114 of image 104.

Image sensor arrays 106 and 108 are positioned at a predetermined distance from one another and at predetermined angles relative to one another to generate fields of view 111 and 114. Preferably image sensor arrays 106 and 108 are each conventional and employ charge coupled device technology or other conventional image sensing mechanisms that provide an electronic signal indicative of image 104. It is preferable that sensor arrays 106 and 108 are closely matched to minimize differences in signals 110 and 112 introduced by device variations in sensors 106 and 108.

Image signals 110 and 112 are time varying signals which are preferably synchronized by way of image data synchronizer 116 to cause signals 110 and 112 to provide time synchronized images of fields of view 111 and 114 and allow the data contained in such signals to be operated on an individual array picture element (pixel) basis. Image data synchronizer 116 operates generally to cause signals 110 and 112 to be time synchronized. This may be accomplished in a number of ways including controlling arrays 106 and 108 to generate signals 110 and 112 synchronously. Alternatively, the image data synchronizer may receive signals 110 and 112, and compare time stamps which may be contained in such signals and control the transmission of signals 110 and 112 to the other destinations such as blocks 118 and 124.

Image signals 110 and 112 are received by Image Size and Position Unit (ISPU) 101 which modifies size and/or position of images represented by signals 110 and 112 to generate signals 103 and 105 that represent fields of view 111 and 114 respectively and are of like size and position. Corrected image signals 103 and 105 are received by function processing unit 118 which generates a difference signal 120 indicative of differences between signals 103 and 105. Difference signal 120 is compressed by a lossy signal compressor 122 to generate signal 126 which is stored on storage device 102. A second lossy signal compressor 124 compresses corrected image signal 103 also for storage in storage device 102. Alternatively, lossy signal compressor 124 may receive signal 105 to generate signal 128. Lossy signal compressors 122 and 124 are preferably conventional and may employ one of a variety of known compression techniques including JPEG, motion JPEG, or MPEG compression algorithms. The compressed difference signal 126 generated by lossy signal compressor 122 and the compressed signal 128 generated by lossy signal compressor 124 advantageously comprise all of the information required to generate a stereographic type image of image 104.

The system shown in FIG. 1 is shown for purposes of explanation only and should not be construed to be limiting in any way. Modules 101, 116, 118, 122 and 124 can be implemented in hardware, software and/or firmware.

Figure 2:
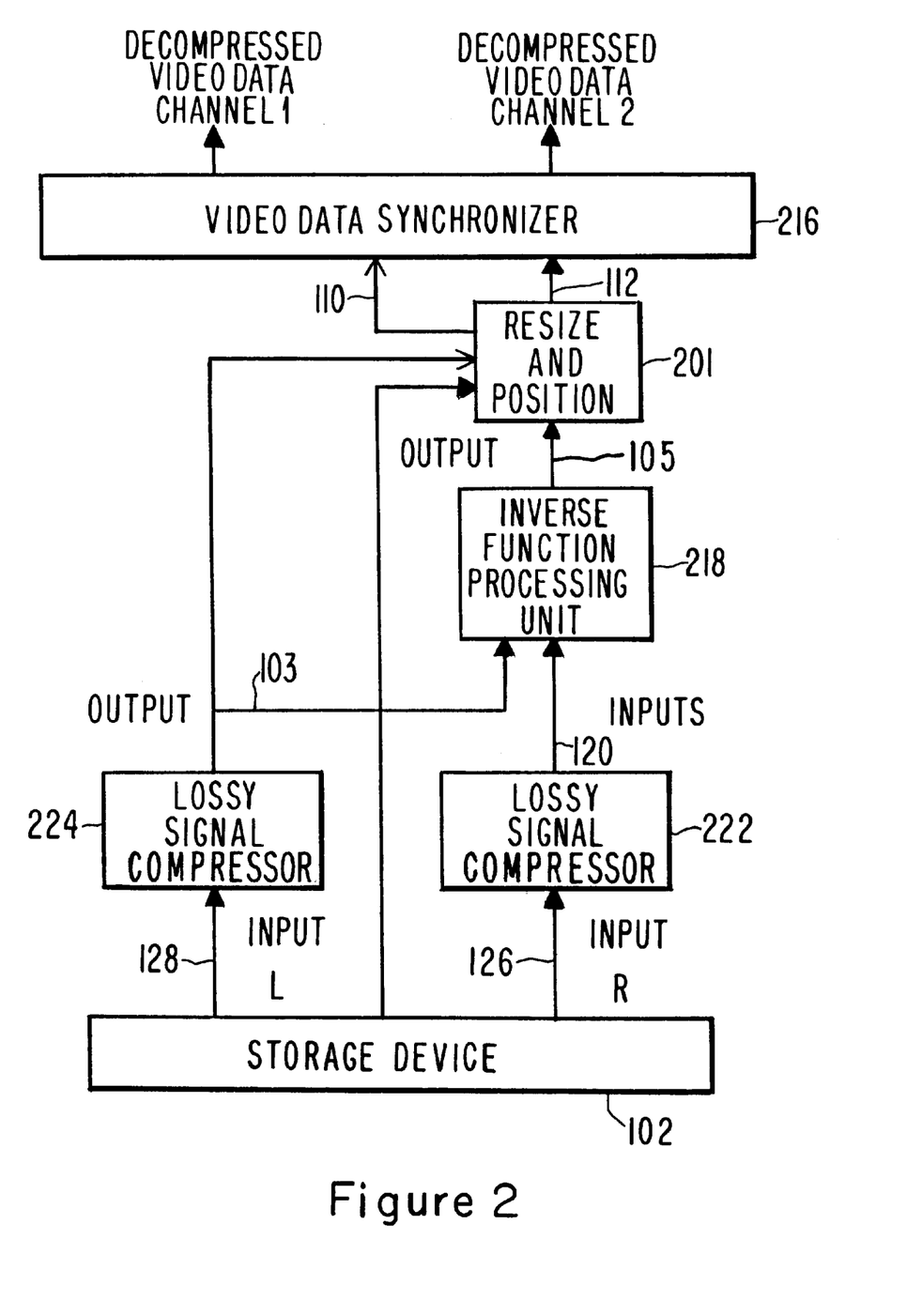
FIG. 2 is a block diagram illustrating generation of a stereographic image from data generated by the system of FIG. 1.

The image stored on storage device 102 may be recreated in a manner shown in FIG. 2. The functions shown in blocks 222, 224, 218, 201 and 216 essentially perform the inverse function of the corresponding functions shown in FIG. 1 to generate two channels 110 and 112 of data. Lossy signal compressors 224 and 222 receive data signals 128 and 126 respectively and decompress the received signals to generate signals 103 and 120. Inverse function processing unit 218 receives signals 103 and 120 and generates data signal 105. ISPU 201 receives signal 105 and generates image signals 110 and 112. Videodata synchronizer 216 receives signals 110 and 112, synchronizes the two signals to generate two channels of data (channel 1 and channel 2) which can be used in a conventional manner to generate a stereographic image.

Figure 3:
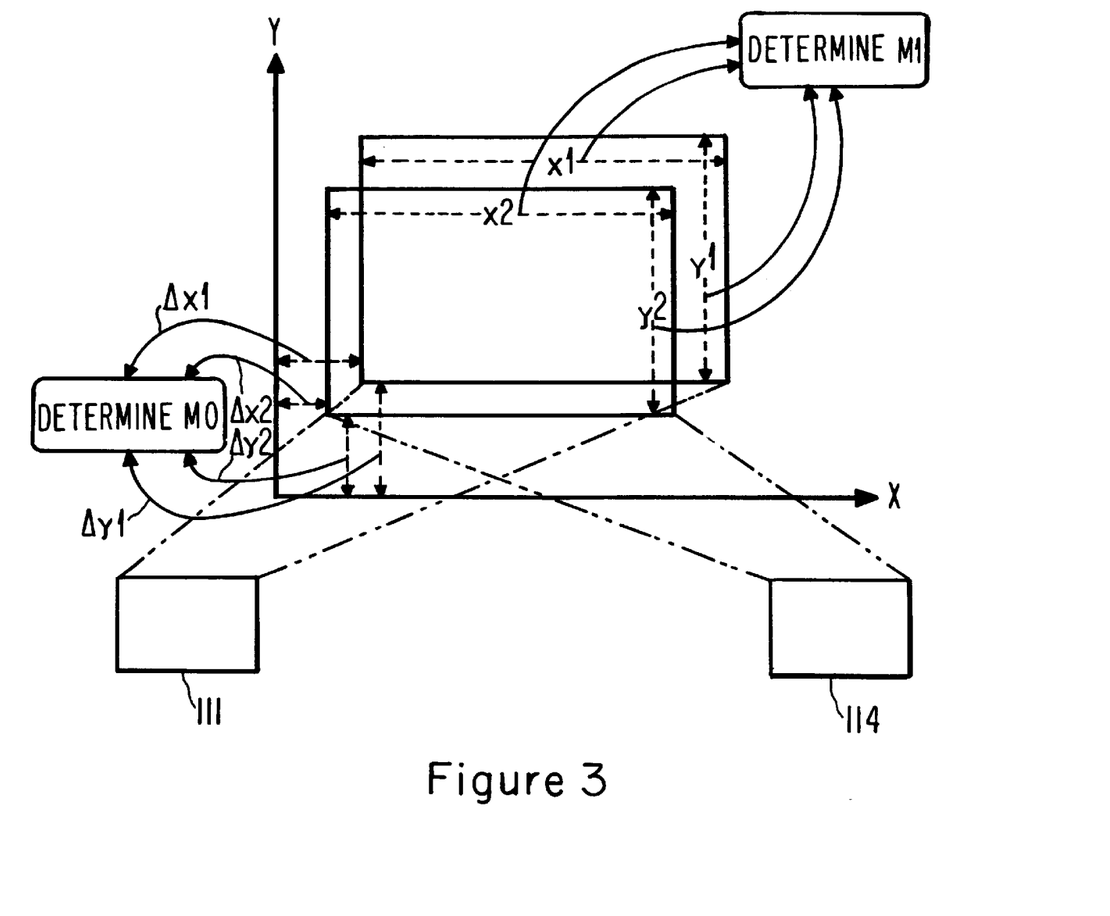
FIG. 3 is a block diagram illustrating operation of the image size and position unit of FIG. 2.

FIG. 3 illustrates operation of ISPU 101. FIG. 3 shows the relative size and position, by way of example in a two-dimensional space characterized by a horizontal (x) axis and a vertical (y) axis, of first field of view 111 and second field of view 114. As shown, fields of view 111 and 114 have different sizes and positions. Field of view 111 is characterized by a first size (X1 by Y1) and a first position ($\Delta$X1, $\Delta$Y1). Field of view 114 is characterized by a second size (X2 by Y2) and a second position ($\Delta$X2, $\Delta$Y2). The difference in size and position between the two fields of view 111 and 114 can occur for a variety of reasons. Small variations in the relative angle between sensor array 106, 108 and image 104 results in each sensor array 106 and 108 capturing an image having a field of view that represents a different portion of image 104. Variations in the sensors 106 and 108, caused by normal manufacturing processes, or gradual degradation of the sensor, result in each sensor array 106 and 108 capturing an image of slightly different size.

ISPU 101 employs a horizontal and vertical axis, such as shown in FIG. 3 to determine the relative size and position of fields of view 111 and 114. The axes simply provide a reference point and the exact positioning of the axes is therefore not important. ISPU 101 determines a first moment value (M0) indicative of a difference in relative position between fields of view 111 and 114 as a function of values ($\Delta$X1, $\Delta$Y1) and ($\Delta$X2, $\Delta$Y2). ISPU 101 also determines a second moment value (M1) indicative of a difference in size between fields of view 111 and 114 as a function of (X1, Y1) and (X2, Y2). The moment values M0 and M1 are used by ISPU 101 to resize and/or reposition one or both fields of view 111 and 114. In essence, the ISPU 101 normalizes the moments, represented by moment values M0 and M1, of fields of view 111 and 114.

Determination of which of the images are resized and/or repositioned may be accomplished in a variety of ways. For example, the images may be resized and repositioned in accordance with a predetermined size and position. This approach provides simplicity of implementation but does not account for variations in the sensors 106 and 108 over time due to small movements in the position of the sensors or degradation of the sensor arrays 106 and 108. The resizing and repositioning may also be selectable by a user based on different criteria, such as image compressibility. Fields of view that have the same size and position have background images that are aligned and thus are characterized by greater compressibility.

User decisions as to resizing and positioning may also be based on image quality considerations. For example, perspective in images is ideally achieved by making background images at infinity from both fields of view to be identical. Thus, the amount of resizing and repositioning may be determined by trial and error based on user preferences as to the quality of perspective achieved by the system 100.

Figure 4A:
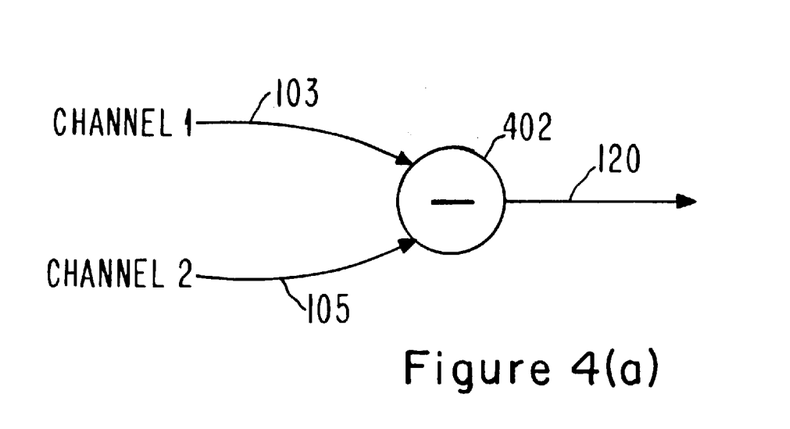
Figure 4B:
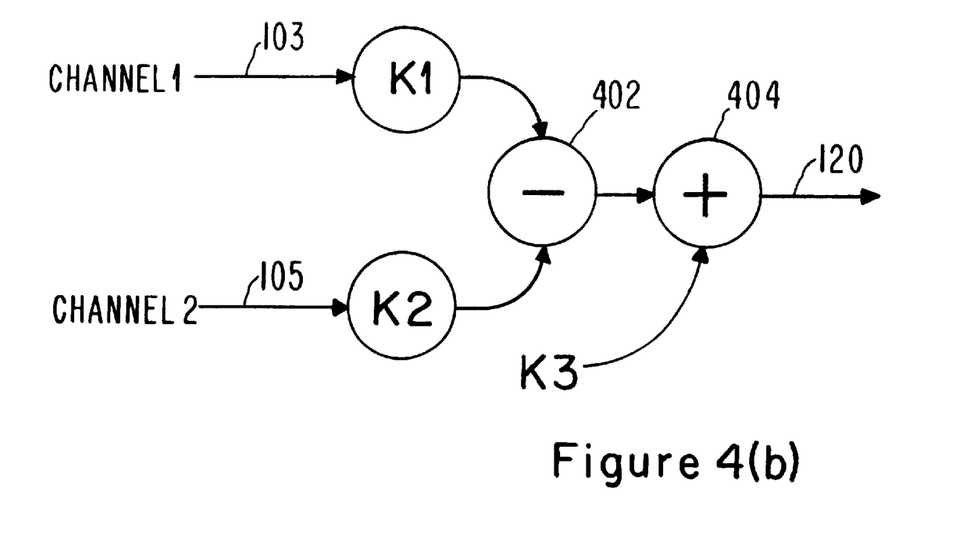
Figure 4C:
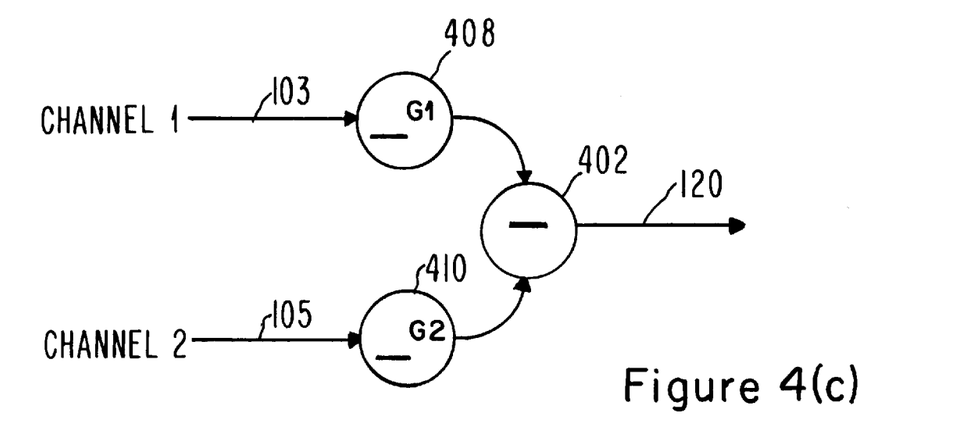
Figure 4D:
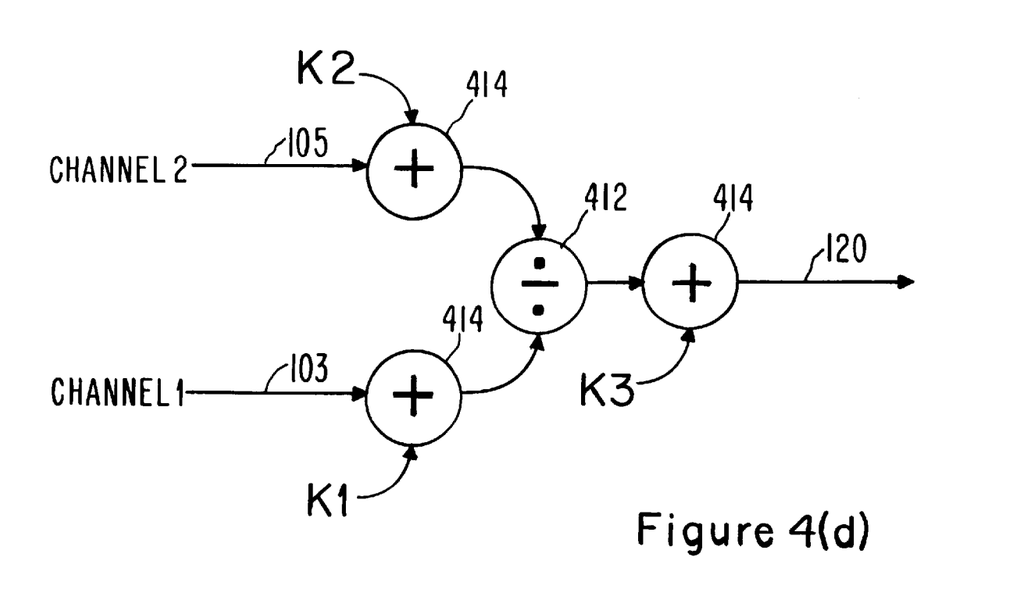

Function processing unit 118 is now described in further detail. Function processing unit 118 preferably takes one of a variety of forms to realize one of a plurality of desired mathematical functions to generate difference signal 120. Four example embodiments of the mathematical functions realized by function processing unit 118 are shown in FIGS. 4(a), 4(b), 4(c) and 4(d). In FIG. 4(a), function processing unit 118, generates signal 120 by way of a subtraction function 402 that generates a difference between corresponding components of signals 110 and 112. In FIG. 4(b) function processing unit 118 scales signals 110 and 112 by respective constants K1 and K2. The difference between corresponding components of the scaled signals is then generated by subtraction function 402. This difference is further modified by addition of an offset represented by constant K3 to generate signal 120. In FIG. 4(c), function processing unit 118 signals 110 and 112 are gamma corrected by exponential values G1 and G2. Gamma correction may be used to correct for a variety of physical phenomena such as matching dynamic range of sensors 106 and 108. For example, if the sensors 106 and 108 provide data, such as twelve-bits per pixel, which exceeds the capacity of the storage device 102 (which may ideally have a capability of eight-bits per pixel) then gamma correction may be used to narrow the dynamic range of the signals 110 and 112 to match the storage capacity of the storage device 102. As a further example, gamma correction may be used to correct for sensor non-linearity. The resulting signals are then fed to subtraction function 402 which generates difference signal 120. In FIG. 4(d), signals 110 and 112 are first scaled by addition of constants K1 and K2 respectively. The resulting signals are then divided by module 412. The resulting value is then modified by way of addition of constant K3 to generate signal 120.

The embodiments shown in FIGS. 3, 4(a), 4(b), 4(c) and 4(d), may operate on either digital or analog representations of signals 110 and 112. The constants such as K1, K2, K3, G1 and G2 that are used for scaling, offsetting or gamma-correcting are preferably either predetermined or selectable to generate difference signal 120 in a manner that provides an acceptable image quality but meets the storage requirements of a particular application. Preferably, the mathematical function shown in FIGS. 4(a), 4(b), 4(c) and 4(d) or other acceptable mathematical function, may be selectable by a user. The user can thus judge which function is appropriate based on prior experience. Alternatively, the functions shown in FIGS. 4(a) to 4(d) may be chosen based on a display providing indication of the amount of output data bandwidth required to represent the difference signal 126.

Figure 5:
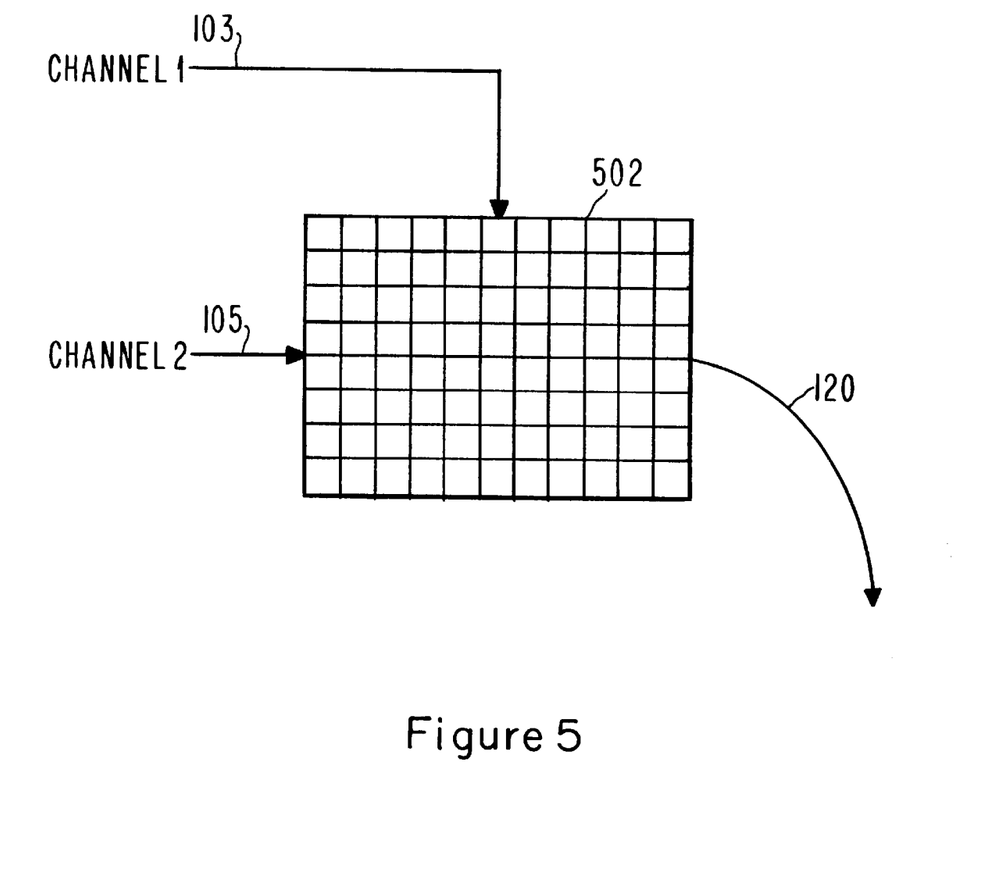
FIG. 5 is a block diagram showing further details of a specific embodiment of the function processing unit of FIG. 1.

FIG. 5 shows an embodiment of function processing unit 118 which operates on digital representations of signals 103 and 105. In FIG. 5, a look-up table 502 is used to store values indicative of predetermined relationships between signals 103 and 105. The lookup table 502 may advantageously be implemented by conventional random-access type of memories. Signals 103 and 105 are used as addresses to access table 502 to generate stored data values 120. The embodiment shown in FIG. 5 advantageously provides rapid generation of signal 120 in response to signals 103 and 105. In the embodiment shown in FIG. 5, the data synchronizer 116, ISPU 101 and lossy signal compressors 122 and 124 may also be implemented by digital mechanisms, including programmed digital computers. In alternative embodiments, function processing unit 118 may be realized by analog circuit components to perform the addition, subtraction, multiplication and division functions shown in FIGS. 4(a), 4(b), 4(c) and 4(d). For such analog embodiments data synchronizer 116, ISPU 101, and signal compressors 122 and 124 may be implemented with either analog or digital mechanisms (including hardware and software) to meet the cost, performance, packaging and other requirements of a particular application.

The goal of the output data 120 of the function processing unit 118 is to represent an approximation to the incoherence between the element data of the two sensor arrays 106 and 108. This transensor incoherence advantageously compresses highly with traditional lossy compression techniques such as employed by compressors 124 and 122. This high compression factor is due to the large amount of spatial coherence present in many regions of the transensor incoherence data. For the extreme case of the image sensors 106 and 108 imaging only far away image objects, the two sensors may have an identical synchronized output data. For this case, utilizing a simple difference processing function such as implemented in FIG. 4(a) results in all zero data from the output of function processing unit 118. This all zero data compresses highly with many lossy compression algorithms. Using this method on many photographic scenes using a spacing between sensors 106 and 108 of an amount approximately the inter-ocular spacing of the human eye, the amount of compression achieved may be much higher than for the case where lossy compression is directly applied to the output of the two sensors. For the case of directly applied compression the image data for two channels is approximately two times the data required for one image channel. While using the function processing techniques described herein, the two channels may require only 10–20% more data size than one channel alone.

The principles described herein may be used with a single frame of image data for still image photography, as well as with time sequential frames for video images as described above. For stationary image scenes a single sensor (106 or 108) may be used to generate depth information by recording the image 104 at two different points in time to capture fields of view 111 and 114. In this case, the image sensor output is stored from two different locations. The function processing unit 118, ISPU 101 and lossy compressors 122 and 124 simply operate on the stored data rather than the data directly from the image sensors.

It is to be understood that the specific mechanisms and techniques which have been described are merely illustrative of one application of the principles of the invention. Numerous modifications may be made to the methods and apparatus described without departing from the true spirit of the invention.

What is claimed is:

1. A stereographic image compressor comprising:

an image size and position unit, responsive to a first image signal containing image information of a scene from a first field of view, and a second image signal containing image information of said scene from a second field of view, for selectively resizing and repositioning said images represented by said first and said second image signals based upon input from a user, to generate a modified first image signal and a modified second image signal, said modified first image signal and said modified second image signal each characterized by a same size and position;

a function processing unit, having a plurality of modes selectable by said user, responsive to said modified first image signal and said modified second image signal, for generating a difference image signal, indicative of differences between said modified first image signal and said modified second image signal; and a lossy compressor, responsive to said difference image signal, for compressing image information contained in said difference image signal, to generate a compressed image information signal.

2. A stereographic image compressor as set forth in claim 1 wherein said image size and position unit further generates size and position modification information indicative of a first difference between said modified first image signal and said first image signal and indicative of a second difference between said modified second image signal and said second image signal.

3. A stereographic image compressor as set forth in claim 2 further comprising a storage device for storing said compressed image information signal, said modified first image signal and said size and position modification information.

4. A stereographic image compressor as set forth in claim 3 further comprising a synchronizer for causing said first image signal and said second image signal to be time synchronized.

5. A stereographic image compressor as set forth in claim 1 further comprising a storage device for storing said compressed image information signal and said modified first image signal.

6. A stereographic image compressor as set forth in claim 1 further comprising a synchronizer for causing said first image signal and said second image signal to be time synchronized.

7. Apparatus for resizing and repositioning image data taken of a similar field of view from two different locations, said apparatus comprising:

synchronizing means, responsive to a pair of image signals, comprising a first image signal containing image information corresponding to a first of said two locations and a second image signal containing image information corresponding to a second of said two locations, for time synchronizing said first image signal with said second image signal;

image size and position means, responsive to said synchronizing means, and reconfigurable in response to commands provided by a user, for modifying said first image signal and said second image signal to generate a modified first image signal and a modified second image signal, said first and second modified image signals being characterized by a single size and position of said field of view;

difference generation means, responsive to said image size and position means, and reconfigurable in response to commands provided by said user, for generating a difference signal, indicative of differences between said first and said second modified image signals; and lossy compressor means, responsive to said difference generation means, for compressing said difference signal.

8. A method for compressing stereographic image data, said method comprising:

generating a first image signal indicative of a first field of view of an image;

generating a second image signal indicative of a second field of view of an image;

modifying said first image signal and said second image signal reconfigurably in response to commands introduced by a user to generate a modified first image signal and a modified second image signal, said first field of view represented by said first image signal being equal in size and position to said second field of view represented by said second image signal;

in response to commands introduced by said user, reconfigurably generating a difference signal indicative of differences in images indicated by said modified first image signal and said modified second image signal;

performing lossy compression on said difference signal to generate a compressed difference signal and performing lossy compression on said modified first image signal to generate a first compressed image signal; and causing storage of said compressed difference signal and said first compressed image signal to a storage device.

9. A method as set forth in claim 8 further comprising the step of generating a size and position modification signal indicative of a difference between said first image signal and said modified first image signal and indicative of a difference between said second image signal and said modified second image signal.

10. A method as set forth in claim 9 further comprising the step of causing storage of said size and position modification signal to said storage device.

11. A computer readable storage medium comprising a stereographic image compressor, comprising:

an image size and position unit, reconfigurably responsive to command signals emanating from a user and responsive to a first image signal containing image information of a scene from a first field of view, and a second image signal containing image information of said scene from a second field of view, for resizing and repositioning said images represented by said first and said second image signals to generate a modified first image signal and a modified second image signal, said modified first image signal and said modified second image signal each characterized by a same size and position;

a function processing unit, reconfigurably responsive to command signals emanating from said user and responsive to said modified first image signal and said modified second image signal, for generating a difference image signal, indicative of differences between said modified first image signal and said modified second image signal; and a lossy compressor, responsive to said difference image signal, for compressing image information contained in said difference image signal, to generate a compressed image information signal.

12. A stereographic image compressor comprising:

an image size and position unit, responsive to a first image signal containing image information of a scene from a first field of view, and a second image signal containing image information of said scene from a second field of view, for selectively resizing and repositioning said images represented by said first and said second image signals based upon input from a user, to generate a modified first image signal and a modified second image signal, said modified first image signal and said modified second image signal each characterized by a same size and position;

a function processing unit, having a plurality of modes selectable by said user, responsive to said modified first image signal and said modified second image signal, for generating a difference image signal, indicative of differences between said modified first image signal and said modified second image signal; and a lossy compressor, responsive to said difference image signal, for compressing image information contained in said difference image signal, to generate a compressed image information signal;

wherein the resizing and repositioning of the images are selectable by the user based upon at least one of image compressability considerations, trial and error, and image quality considerations.

13. A stereographic image compressor comprising:

an image size and position unit, responsive to a first image signal containing image information of a scene from a first field of view, and a second image signal containing image information of said scene from a second field of view, for selectively resizing and repositioning said images represented by said first and said second image signals based upon input from a user, to generate a modified first image signal and a modified second image signal, said modified first image signal and said modified second image signal each characterized by a same size and position;

a function processing unit, having a plurality of modes selectable by said user, responsive to said modified first image signal and said modified second image signal, for generating a difference image signal, indicative of differences between said modified first image signal and said modified second image signal; and a lossy compressor, responsive to said difference image signal, for compressing image information contained in said difference image signal, to generate a compressed image information signal;

wherein the modes of the function processing unit comprise at least one of the following:

the modified first image signal and the modified second image signal are each scaled by constants, creating two new signals which are subtracted from each other and augmented by the addition of an offset;

the modified first image signal and the modified second image signal are each gamma corrected by exponential values, creating two gamma corrected signals which are subtracted from each other; and the modified first image signal and the modified second image signal are each augmented by the addition of constants, creating two resulting signals which are divided then augmented by the addition of a constant.

14. Apparatus for resizing and repositioning image data taken of a similar field of view from two different locations, said apparatus comprising:

synchronizing means, responsive to a pair of image signals, comprising a first image signal containing image information corresponding to a first of said two locations and a second image signal containing image information corresponding to a second of said two locations, for time synchronizing said first image signal with said second image signal;

image size and position means, responsive to said synchronizing means, and reconfigurable in response to commands provided by a user, for modifying said first image signal and said second image signal to generate a modified first image signal and a modified second image signal, said first and second modified image signals being characterized by a single size and position of said field of view;

difference generation means, responsive to said image size and position means, and reconfigurable in response to commands provided by said user, for generating a difference signal, indicative of differences between said first and said second modified image signals; and lossy compressor means, responsive to said difference generation means, for compressing said difference signal;

wherein said reconfigurable image size and position means has at least one of the following modes:
  a mode based upon image compressibility considerations;
  a mode based upon trial and error; and
  a mode based upon image quality considerations.

15. Apparatus for resizing and repositioning image data taken of a similar field of view from two different locations, said apparatus comprising:

synchronizing means, responsive to a pair of image signals, comprising a first image signal containing image information corresponding to a first of said two locations and a second image signal containing image information corresponding to a second of said two locations, for time synchronizing said first image signal with said second image signal;

image size and position means, responsive to said synchronizing means, and reconfigurable in response to commands provided by a user, for modifying said first image signal and said second image signal to generate a modified first image signal and a modified second image signal, said first and second modified image signals being characterized by a single size and position of said field of view;

difference generation means, responsive to said image size and position means, and reconfigurable in response to commands provided by said user, for generating a difference signal, indicative of differences between said first and said second modified image signals; and lossy compressor means, responsive to said difference generation means, for compressing said difference signal;

wherein the difference generation means is reconfigurable to exhibit at least one of the following characteristics:
  the modified first image signal and the modified second image signal are each scaled by constants, creating two new signals which are subtracted from each other and augmented by the addition of an offset;
  the modified first image signal and the modified second image signal are each gamma corrected by exponential values, creating two gamma corrected signals which are subtracted from each other; and
  the modified first image signal and the modified second image signal are each augmented by the addition of constants, creating two resulting signals which are divided then augmented by the addition of a constant.

16. A method for compressing stereographic image data, said method comprising:

generating a first image signal indicative of a first field of view of an image;

generating a second image signal indicative of a second field of view of an image;

modifying said first image signal and said second image signal reconfigurably in response to commands introduced by a user to generate a modified first image signal and a modified second image signal, said first field of view represented by said first image signal being equal in size and position to said second field of view represented by said second image signal;

in response to commands introduced by said user, reconfigurably generating a difference signal indicative of differences in images indicated by said modified first image signal and said modified second image signal;

performing lossy compression on said difference signal to generate a compressed difference signal and performing lossy compression on said modified first image signal to generate a first compressed image signal; and causing storage of said compressed difference signal and said first compressed image signal to a storage device;

wherein the step of modifying said first image signal and said second image signal reconfigurably takes into account at least one of image compressibility considerations, trial and error, and image quality considerations.

17. A method for compressing stereographic image data, said method comprising:

generating a first image signal indicative of a first field of view of an image;

generating a second image signal indicative of a second field of view of an image;

modifying said first image signal and said second image signal reconfigurably in response to commands introduced by a user to generate a modified first image signal and a modified second image signal, said first field of view represented by said first image signal being equal in size and position to said second field of view represented by said second image signal;

in response to commands introduced by said user, reconfigurably generating a difference signal indicative of differences in images indicated by said modified first image signal and said modified second image signal;

performing lossy compression on said difference signal to generate a compressed difference signal and performing lossy compression on said modified first image signal to generate a first compressed image signal; and causing storage of said compressed difference signal and said first compressed image signal to a storage device;

wherein the step of reconfigurably generating a difference signal is performed using one of the following techniques:
> the modified first image signal and the modified second image signal are each scaled by constants, creating two new signals which are subtracted from each other and augmented by the addition of an offset;
>
> the modified first image signal and the modified second image signal are each gamma corrected by exponential values, creating two gamma corrected signals which are subtracted from each other; and
>
> the modified first image signal and the modified second image signal are each augmented by the addition of constants, creating two resulting signals which are divided then augmented by the addition of a constant.

18. A computer readable storage medium comprising a stereographic image compressor, comprising:

an image size and position unit, reconfigurably responsive to command signals emanating from a user and responsive to a first image signal containing image information of a scene from a first field of view, and a second image signal containing image information of said scene from a second field of view, for resizing and repositioning said images represented by said first and said second image signals to generate a modified first image signal and a modified second image signal, said modified first image signal and said modified second image signal each characterized by a same size and position;

a function processing unit, reconfigurably responsive to command signals emanating from said user and responsive to said modified first image signal and said modified second image signal, for generating a difference image signal, indicative of differences between said modified first image signal and said modified second image signal; and a lossy compressor, responsive to said difference image signal, for compressing image information contained in said difference image signal, to generate a compressed image information signal;

wherein the image size and position unit is reconfigurable based upon at least one of image compressibility considerations, trial and error, and image quality considerations.

19. A computer readable storage medium comprising a stereographic image compressor, comprising:

an image size and position unit, reconfigurably responsive to command signals emanating from a user and responsive to a first image signal containing image information of a scene from a first field of view, and a second image signal containing image information of said scene from a second field of view, for resizing and repositioning said images represented by said first and said second image signals to generate a modified first image signal and a modified second image signal, said modified first image signal and said modified second image signal each characterized by a same size and position;

a function processing unit, reconfigurably responsive to command signals emanating from said user and responsive to said modified first image signal and said modified second image signal, for generating a difference image signal, indicative of differences between said modified first image signal and said modified second image signal; and a lossy compressor, responsive to said difference image signal, for compressing image information contained in said difference image signal, to generate a compressed image information signal;

wherein the function processing unit is reconfigurable to operate in at least one of the following modes:
> the modified first image signal and the modified second image signal are each scaled by constants, creating two new signals which are subtracted from each other and augmented by the addition of an offset;
>
> the modified first image signal and the modified second image signal are each gamma corrected by exponential values, creating two gamma corrected signals which are subtracted from each other; and
>
> the modified first image signal and the modified second image signal are each augmented by the addition of constants, creating two resulting signals which are divided then augmented by the addition of a constant.

* * * * *

UNITED STATES PATENT AND TRADEMARK OFFICE
CERTIFICATE OF CORRECTION

| | |
|---|---|
| PATENT NO. | : 6,275,253 B1 |
| DATED | : August 14, 2001 |
| INVENTOR(S) | : Roger D. Melen |

It is certified that error appears in the above-identified patent and that said Letters Patent is hereby corrected as shown below:

Title page,
Item [57], ABSTRACT,
Line 13, "(105)" should read -- (105). --.

Column 1,
Lines 35-37, all type should be larger size.

Column 4,
Line 44, "118," should read -- 108 --.

Signed and Sealed this

Seventh Day of May, 2002

Attest:

Attesting Officer

JAMES E. ROGAN
Director of the United States Patent and Trademark Office